( 12 ) United States Patent
Götvall

(10) Patent No.: US 11,407,113 B2
(45) Date of Patent: Aug. 9, 2022

(54) DEVICE USABLE BY ROBOT AND HUMAN

(71) Applicant: Volvo Truck Corporation, Gothenburg (SE)

(72) Inventor: Per-Lage Götvall, Bollebygd (SE)

(73) Assignee: Volvo Truck Corporation, Gothenburg (SE)

( * ) Notice: Subject to any disclaimer, the term of this patent is extended or adjusted under 35 U.S.C. 154(b) by 545 days.

(21) Appl. No.: 16/604,779

(22) PCT Filed: Apr. 12, 2018

(86) PCT No.: PCT/EP2018/025114
§ 371 (c)(1),
(2) Date: Oct. 11, 2019

(87) PCT Pub. No.: WO2018/188817
PCT Pub. Date: Oct. 18, 2018

(65) Prior Publication Data
US 2020/0376667 A1 Dec. 3, 2020

(30) Foreign Application Priority Data

Apr. 13, 2017 (WO) ................. PCT/EP2017/058939

(51) Int. Cl.
*B25J 9/16* (2006.01)
(52) U.S. Cl.
CPC ............. *B25J 9/1679* (2013.01); *B25J 9/161* (2013.01); *B25J 9/1694* (2013.01)

(58) Field of Classification Search
CPC ........ B25J 9/1679; B25J 9/161; B25J 9/1694; B25J 9/1602; G05B 2219/35433; G05B 2219/45127
See application file for complete search history.

(56) References Cited

U.S. PATENT DOCUMENTS

| 5,903,462 | A | 5/1999 | Wagner et al. |
| 6,940,033 | B1 | 9/2005 | Jones, Jr. et al. |
| 2009/0259412 | A1 | 10/2009 | Brogardh |
| 2015/0120041 | A1* | 4/2015 | Wise ..................... B25J 19/005 901/41 |

OTHER PUBLICATIONS

International Search Report and Written Opinion for International Patent Application No. PCT/EP2018/025114, dated May 28, 2018, 10 pages.

* cited by examiner

*Primary Examiner* — Basil T. Jos
(74) *Attorney, Agent, or Firm* — Withrow & Terranova, PLLC

(57) ABSTRACT

The invention relates to a device (10) interchangeably usable by a robot (12) and a human (14). The present invention also relates to a system (100) comprising such a device, a method of operating such a device (10), and a computer readable medium (46). The invention can for example be applied in servicing of heavy-duty vehicles.

16 Claims, 4 Drawing Sheets

DEVICE USABLE BY ROBOT AND HUMAN

This application is a 35 USC 371 national phase filing of International Application No. PCT/EP2018/025114, filed Apr. 12, 2018, which claims priority to International Application No. PCT/EP2017/058939, filed Apr. 13, 2017, the disclosures of which are incorporated herein by reference in their entireties.

TECHNICAL FIELD

The invention relates to a device which may be used by a robot and a human, a system comprising such a device, a method of operating such a device, and a computer readable medium. The invention can for example be applied in servicing of heavy-duty vehicles, such as trucks, buses and construction equipment.

BACKGROUND

Work-tasks are generally performed either by a robot or by a human. In servicing of heavy-duty vehicles, service-tasks like oil exchange and changing of wheels are typically performed directly by a human, although automation and involvement of robots may be desired.

SUMMARY

An object of the invention is to provide a device, system and method which beneficially may allow and/or facilitate involvement of robots, in particular in servicing of (heavy-duty) vehicles.

According to a first aspect of the invention, the object is achieved by a device according to claim 1. According to a second aspect of the invention, the object is achieved by a system according to claim 10. According to a third aspect of the invention, the object is achieved by a method according to claim 15. According to a fourth aspect, the object is achieved by a computer readable medium according to claim 18.

According to the first aspect, there is provided a device interchangeably usable by a robot and a human, wherein the device comprises: a base unit including a robot connector for connection to the robot, at least one of a surface grippable by the human and a grip grippable by the human, a communications unit for wireless communication with a control 30 station, a processor connected to the communications unit, an energy storage for powering at least the communications unit and the processor, and means adapted to detect whether the device is connected to the robot or used directly by the human; and a tool for performing an operation related to a vehicle or a vehicle related object, which tool is connected to the base unit, wherein the device is adapted to be controlled by the control station to perform at least some of the operation related to a vehicle or a vehicle related object if said means detects that the device is connected to the robot.

The present device is interchangeably usable by a robot and a human. Hence, the device may be connected to a robot or used directly by a human. In other words, the device may be used by both a robot and a human, albeit typically not at the same time. For example, the device may first be directly used by the human to perform one operation on the vehicle, and then the same device, possibly with a different tool connected to the base unit, may be connected to and used by the robot instead of by the human to perform another operation on the vehicle or on another vehicle. Thereafter, the device may again be connected to and used by the robot or by another robot, and so on. The expression "used directly by a human" means herein that the human is holding and gripping the device by e.g. his/her hand(s) to thereby perform an operation on a vehicle or a vehicle related object.

The present invention is based on the understanding that by providing a device which interchangeably may be used by a robot and a human, i.e. either connected to the robot or used directly by the human, there is no need to provide one tool specifically designed for human use and one tool specifically designed for robotic use, which in turn may reduce cost. Furthermore, by means of the built in processor and energy storage, the device has its own intelligence and power, which in turn can make the device "smart" and versatile. Overall, the present device may allow increased flexibility, and it may facilitate an increase of automation level in for example servicing of vehicles, in particular heavy-duty vehicles. Moreover, by providing the means that detects whether the device is connected to the robot or used directly by a human, an increased safety may be realized. This may be especially important in an environment where humans are present, such as in a vehicle service center or in a vehicle manufacturing facility. For example, the control station may not start a tool operation until it knows that the device is firmly connected to the robot. Furthermore, the control station may not initiate a tool operation adapted for the robot when a human is gripping the tool. Still further, the control station may not initiate a movement of the robot while a human is directly using the device. Hence, personal injuries may be avoided.

Another advantage of the present device is that it provides an increased flexibility and robustness in that it may switch between robot use and direct human use during one vehicle related operation. Hence, if a robot for some reason fails to complete an operation, a human may take over by disconnecting the device from the robot and then finalize the operation. For this situation, the means adapted to detect whether the device is connected to the robot or used directly by the human is beneficial since the detection may be used as input to adapt how the operation is continued after the device has switched between robot and human use, or vice versa.

It should be noted that US2009259412 discloses a tool provided with a robot connection part for connection to the robot, wherein a handle is attached to a main body of the tool by means of a connection during programming. However, the tool in US2009259412 is not interchangeably usable by a robot and a human in connection with performance of an operation related to a vehicle or vehicle related device like the present device. Instead, the system in US2009259412 is useful for controlling a tool or a work object manipulated by an industrial robot in connection with lead-through programming of the robot.

The present device may be adapted to be controlled by the control station to perform some of the operation related to a vehicle or a vehicle related object if said means detects that the device is used directly by the human. That is, even if the device is used by the human, i.e. the human is holding the device, the control station may nevertheless control the device to perform some of the operation, whereas the human may perform the rest of the operation. This allows for various degrees of automation. For example, in case the tool currently connected to the base unit is a screwdriver, the human may accurately position the device's screwdriver in the screw, whereas the turning of the screwdriver is controlled wirelessly by the control station. Alternatively, if said means detects that the device is used directly by the human, the human may control the device to perform the complete operation.

Said means may be adapted to detect whether the device is connected to the robot or used directly by the human by detecting whether the robot connector is connected to the robot. If the means detects that the robot connector is connected to the robot, the device is connected to and thus used by the robot. And if the means detects that the robot connector is not connected to the robot, the device is directly used by the human. Alternatively, said means could include a switch activatable by the human, wherein the means detects that the device is directly used by the human if the switch is activated and connected to the robot if the switch is not activated. Additionally, said means may also be able to detect whether the device is moving. If said means detects that the device is moving and also that the device is not connected to the robot, it indicates that the device is used directly by the human. Just as a matter of example, a movement detection sensor, such as a gyroscope (e.g. MEMS gyro), may be used for this purpose.

The processor may be adapted to wake up when the device is removed from a device holder. This saves energy when the device is not used. The device may further be adapted to present itself to the control station after the processor is woken up.

The device may be adapted to inform the control station whether the device is connected to the robot or used directly by the human, whereby the control station may control the device accordingly.

The tool may be removably connected to the base unit. This allows the same base unit to be used with various different tools, which increases the versatility. The tool may for example be selected from the group comprising, but not limited to: a screwdriver, a socket wrench, a hot-air gun (for a drying operation), a glue gun, a painting nozzle, a camera, and a LIDAR device for measurement of the vehicle or part of the vehicle.

The base unit may further include at least one actuator adapted to move the tool, wherein the at least one actuator is powered by electric energy from the energy storage and controlled via the processor. The at least one actuator may for example be a motor adapted to rotate the tool, or a linear actuator adapted to move the tool in a straight line. By including an energy storage and at least one actuator in the base unit, the device is not dependent on external driving of the tool from for example the robot. Alternatively, the tool could be driven by an external power source, for example mains electricity, a pneumatic system or a hydraulic system.

The base unit may further include at least one sensor adapted to detect internal or external data of the device, wherein the processor is configured to read and analyse the detected data. The device may hence provide already analysed data to for example the control station via the communication unit rather than raw sensor data. This makes the device less dependent on a back-office tool (for example the control station) for analysis. Also, less bandwidth may be required or consumed in the wireless communication with the control station. The detected data may for example be imagery which the processor analyses to e.g. provide the level of wear of a kingpin on a steering column. In another example, the detected data is x, y, z position and yaw, pitch, roll of the tool, which data the processor analyses to determine whether the tool (for example a net runner) is correctly aligned with a nut or not. The at least one sensor may for example be one or more of: a sensor adapted to detect position of the aforementioned at least one actuator, a sensor adapted to detect power consumption of the aforementioned at least one actuator, a distance sensor adapted to detect the distance between the device and for example the aforementioned vehicle or vehicle related object, a position sensor adapted to detect the position of the device, a temperature sensor adapted to detect the temperature outside the device, a video camera, and a touch sensor. Just as a matter of example, imagery data may be used for image recognition, which in turn may be used to detect different aspects of the vehicle or vehicle related object. In one example, image recognition may be performed by a Convolutional Neural Network (CNN or ConvNet). This may for example be used for identifying different objects which in turn may have different requirements regarding e.g. servicing. For example, different screws on an engine may need to be tightened with different tightening torques. Therefore, by recognizing which screw that is being tightened, the tool may be controlled to adapt the torque levels accordingly.

The base unit may further include a user interface adapted to present information related to said operation for the human. In this way, the operation may more efficiently be performed when the device is used by the human. The information may for example come from the aforementioned at least one sensor (via the processor) or from the control station (via the communications unit), and the information may for example include instructions for the human regarding how to perform the operation, the progress of the operation, request some input from the human, etc. The user interface may for example include one or more of at least one LED (light emitting diode), a vibration motor, one or more pushbuttons, one or more switches (for example the aforementioned switch activatable by the human), and a (touch) display.

The base unit may further include at least one additional robot connector for connection to the robot. Providing an additional robot connector may further increase the flexibility of the device. For example, if providing two robot connectors which are offset in respect of each other, such as by about 90 degrees, more operations may be performed by the tool when the device is connected to the robot. More particularly, certain components of a vehicle may be difficult to reach, and by increasing the ability for the tool to reach these components, more operations may be performed by the robot without human involvement.

The robot may further be an autonomous robot. Hence, no human involvement may occur when the robot is operating.

The device may further comprise means to detect which human is directly using the device. Hence, the device may therefore be able to adapt how it is operating depending on who is using the device. For example, humans may have different physical abilities, i.e. they may have different lengths, strengths, certain abilities/disabilities etc. Moreover, humans may have different skill levels. Therefore, by detecting which human is using the device, the control of the device may be adapted and tailored for that specific human. This further increases the versatility of the device. Said means may further be able to detect to which robot the device is connected. Analogously, robots may also be different and therefore it may be advantageous to also recognize to which robot the device is connected. Just as a matter of example, said detection may be performed by an RFID reader/tag on the device/human and on the device/robot, or any other suitable detection/identification means.

According to the second aspect, there is provided a system, comprising: a device according to the first aspect; a device holder adapted to hold and charge the device; and the control station, wherein the control station is adapted to control the device at least when the device is connected to the robot. This aspect may exhibit the same or similar features and technical effects as the first aspect, and vice versa.

The aforementioned device may be a first device, wherein one or more different tools of a first group are connectable to the base unit of the first device, wherein the system further comprises a second device according to the first aspect, and wherein one or more different tools of a second group which is different than the first group are connectable to the base unit of the second device. The base unit of the first device and the base unit of the second device may have different properties and/or features depending on the tool(s) of the first and second groups. The base unit of the first device may for example comprise the aforementioned at least one actuator and the first group may comprise the screwdriver and the socket wrench (both rotated by the actuator(s)), whereas the base unit of the second device does not have such actuator(s) and the second group comprises the camera and the LIDAR device (both powered by electric energy from the energy storage). Alternatively, the base unit of the second device may also have at least one actuator, but of greater power than the actuator(s) of the base unit of the first device, whereby the second group may comprise a screwdriver and/or a socket wrench for greater dimensions than those of the first group. The system could further comprise a third device with a different base unit for a third group of tools, and so on.

The system may be arranged in a vehicle service center. Alternatively, it could be arranged in a vehicle manufacturing facility, for example.

The system may further comprise a database with protocols and/or instructions for a plurality of different operations related to a vehicle or a vehicle related object to be performed by means of the tool of the device.

According to the third aspect, there is provided a method of operating a device according to the first aspect, wherein the method comprises the steps of: the device detecting whether it is connected to the robot or used directly by the human; if the device detects that it is connected to the robot, the control station controlling both the robot and the device to perform the operation related to a vehicle or a vehicle related object; and if the device detects that it is directly used by the human, the human controlling the device to perform at least some of the operation related to a vehicle or a vehicle related object. This aspect may exhibit the same or similar features and technical effects as the first and/or second aspect, and vice versa.

In one or more embodiments, if the device detects that it is connected to the robot, the robot only positions the device as controlled by the control station. Hence, the robot does not otherwise control the device. This means that the need to customize the robot for various devices and tools is removed or at least alleviated. Hence, the control station is preferably separate from the robot, which in turn may have its own control unit.

In one or more embodiments, if the device detects that it is used directly by the human, the human controls the device to perform a part of the operation related to a vehicle or a vehicle related object, and the control station controls the device to perform another part of the operation related to a vehicle or a vehicle related object, as exemplified above.

Further advantages and advantageous features of the invention are disclosed in the following description and in the dependent claims.

According to the fourth aspect, there is provided a computer readable medium with protocols and/or instructions for a plurality of different operations related to a vehicle or a vehicle related object to be performed by means of the tool of the device according to the first aspect. This aspect may exhibit the same or similar features and technical effects as any of the first to third aspects, and vice versa.

BRIEF DESCRIPTION OF THE DRAWINGS

With reference to the appended drawings, below follows a more detailed description of embodiments of the invention cited as examples.

DETAILED DESCRIPTION OF EXAMPLE EMBODIMENTS OF THE INVENTION

Figure 1:
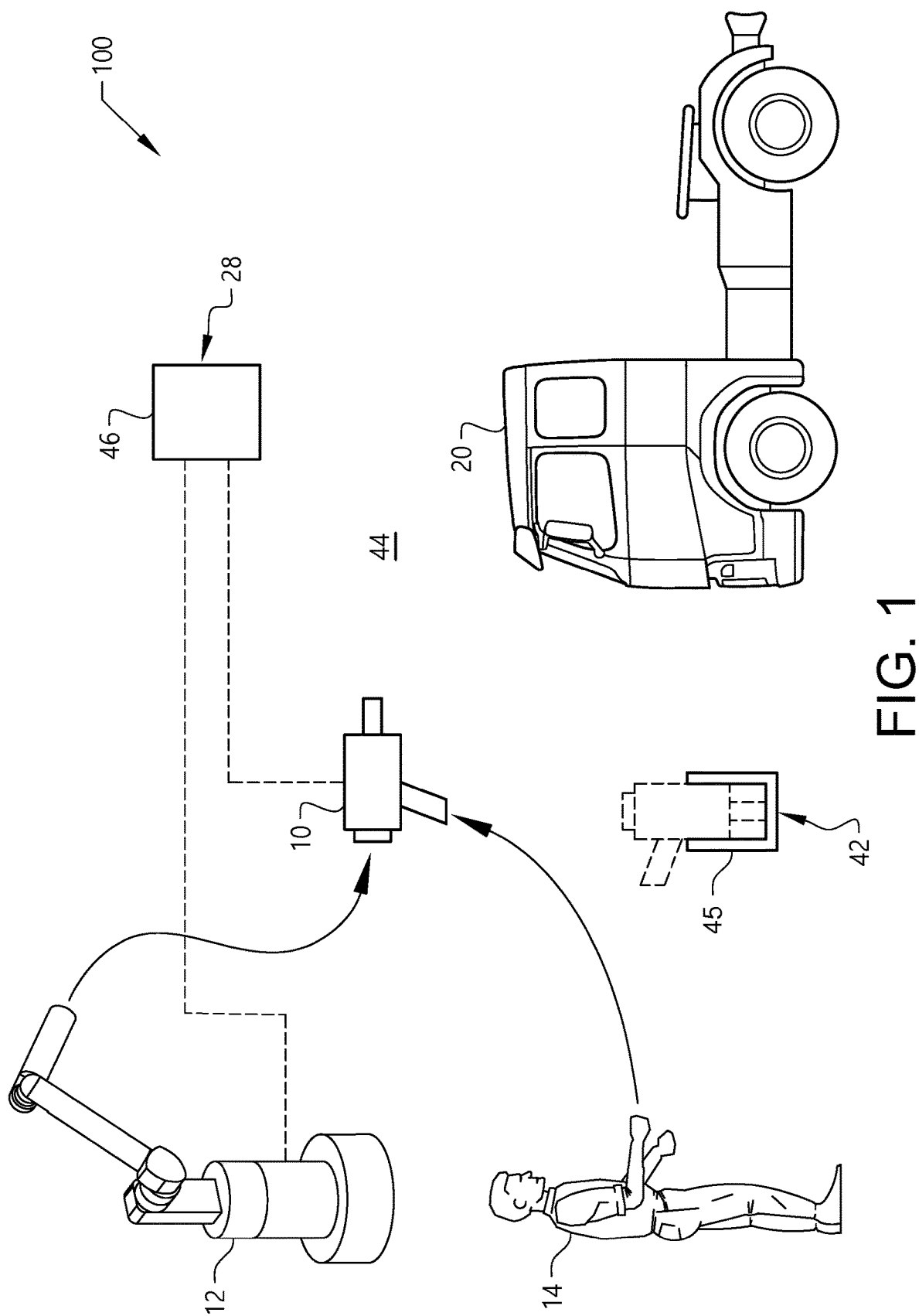
FIG. 1 is a schematic side view of a system comprising a device according to one or more embodiments of the invention.

FIG. 1 is a schematic side view of a system 100 comprising a device 10 according to one 25 or more embodiments of the invention. The device 10 is shown in more detail in FIG. 2.

The device 10 is interchangeably usable by a robot 12 and a human 14. Hence, the device may be connected to a robot or used directly by a human. In other words, the device 10 may be used by both the robot 12 and the human 14, albeit typically not at the 30 same time.

The device 10 comprises a base unit 16 and a tool 18 for performing an operation related to a vehicle 20 or a vehicle related object.

The illustrated base unit 16 includes a robot connector 22 for connection to the robot 12, a grip 24 grippable by the human 14, a communications unit 26 for wireless communication with a control station 28 which is external of the device 10, a processor 30, an energy storage 32, means 34 adapted to detect whether the device 10 is connected to the robot 12 or used directly by the human 14, at least one actuator 36 adapted to move the tool, at least one sensor 38 adapted to detect internal or external data of the device 10, and a user interface 40.

The robot connector 22 allows the device 10 to be at least mechanically connected to the robot 12. The robot connector 22 may be arranged at the back of the base unit 16. The robot connector 22 may for example be the Tool Changer TC5-4E provided by RSP (Robot System Products).

The grip 24 allows the human 14 to hold the device 10, i.e. to directly use the device. The grip 42 may for example be a pistol-grip. Alternatively, the grip 42 could be dual handles. The grip 24 may be 3D-printed, to fit the human in a good way. Furthermore, the grip 24 may be detachable. In addition to the grip 24, or instead of the grip 24, the base unit 16 may include a mere surface (not shown) grippable by the human 14. The grippable surface may be used for applications/tools 18 which do not need the grip 24, which grip 24 then may be omitted or detached from the base unit 16.

The communications unit 26 allows wireless communication between the device 10 and the control station 28. The communication is typically bi-directional. The communications unit 26 may for example comprise a chip and an antenna (not shown). The communications unit 26 may for example be based on WiFi, Bluetooth, ZigBee, 4G, 5G, etc.

The processor 30 is connected at least to the communications unit 26, the actuator(s) 36, and the sensor(s) 38. The processor 30 may form part of a computer (not shown) embedded in the base unit 16. The computer may be a single board computer.

The energy storage 32 is used to power at least the communications unit 26, the processor 30, the actuator(s) 36, possibly the sensor(s) 38, and the user interface 40. The energy storage 32 may for example be a battery, such as a lithium ion battery. The capacity of the energy storage 32 may for example depend on what processor 30 and actuator(s) 36 that are included in the device 10. The energy storage 32 may be rechargeable. The base unit 16 may comprise means (not shown) for charging of the energy storage 32, in particular for wireless charging of the energy storage 32.

The means 34 is here adapted to detect whether the robot connector 22 is connected to the robot 12 or not. If the means 34 detects that the robot connector 20 is connected to the robot 12, the device 10 is used by the robot 12. And if the means 34 detects that the robot connector 22 is not connected to the robot 12, it is assumed that the device 10 is used by the human 10. The means 34 may at least partly be incorporated in the robot connector 22. The means 34 may for example comprise an electrical circuit that is shorted or closed by a connector on the robot 12 when the (connector of the) robot 12 is connected to the robot connector 22 of the base unit 16. Shorting or closing the electrical circuit causes an electrical current to flow in the electrical circuit, which in turn may cause a measurable voltage drop over a resistor in the electrical circuit. If this voltage drop is above a certain level, that indicates that the robot 12 has connected to the device 10.

The at least one actuator 36 is powered by electric energy from the energy storage 32 and controlled via the processor 30. The at least one actuator 36 is here an electrical motor adapted to rotate the tool 18, but it could alternatively be a linear actuator, for example.

The at least one sensor 38 may be adapted to detect internal data such as position and power consumption of the actuator(s) 36 and/or external data such as distance to the vehicle 20, the position of the device 10, the outside temperature, imagery, and touch/contact between for example the device 10 and the vehicle 20. Data detected by the sensor(s) 38 may be read and analysed by the processor 30.

The user interface 40 is adapted to present information related to the aforementioned operation for the human 14. The information may for example come from the aforementioned sensor(s) 38 or from the control station 28, and the information may for example include instructions for the human 14 regarding how to perform the operation, the progress of the operation, etc. The user interface 40 may also be adapted to receive input from the human 14. The user interface 40 may for example be a touch display, but it could alternatively or complementary include LEDs, a vibration motor, buttons, switches, etc.

The tool 18 is connected to the base unit 16. The tool 18 may be connected at the front of the base unit 16. The tool 18 may be mechanically connected to the base unit 16. Furthermore, the tool 18 may be removably connected to the base unit 16, so that different tools 18 could be connected to the base unit 16. That is, the base unit 16 may be generic in that different tools 18 can be connected to the base unit 16. In case the actuator 36 of the base unit 16 is the aforementioned electric motor, the tool 18 may for example be a screwdriver or a socket wrench. In case the base unit 16 does not have any actuator, the tool 18 may for example be a hot-air gun or a camera or a LIDAR device. In this case, the tool 18 may also be electrically connected to the base unit 16 so that it can be powered by electric energy from the energy storage 32.

Figure 2:
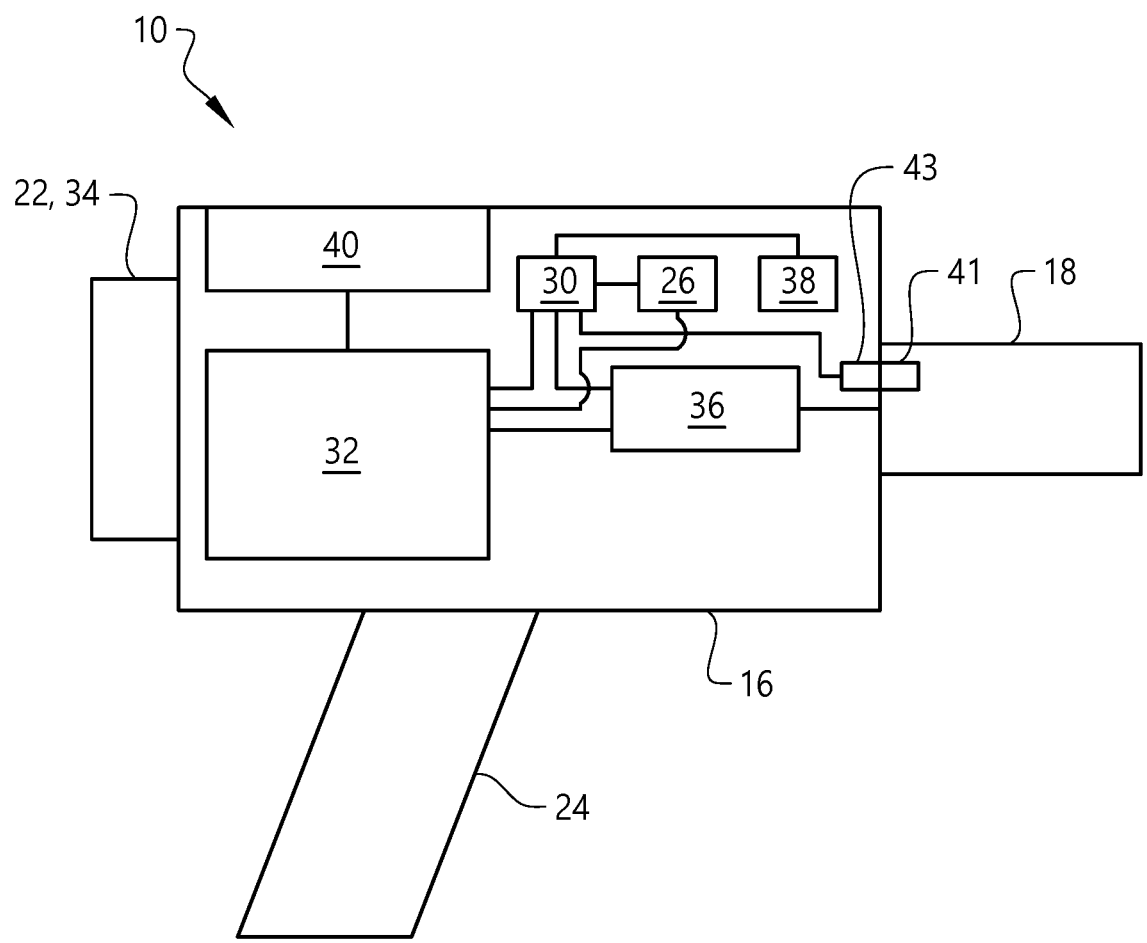
FIG. 2 is a schematic side view of the device of FIG. 1.

The tool 18 may have a memory device 41 adapted to store information, and the base unit 16 may have (corresponding) means 43 adapted to read information from, and/or write information to, the memory device 41. The memory device 41 may be an electronic memory device 41 (read-write non-volatile memory, e.g. Universal Integrated Circuit Card (UICC)), wherein means 43 may comprise a processing part and connectors, wherein the latter are connectable to contacts of the memory device 41. The processing part may be a separate unit or it may be incorporated in the aforementioned processor 30. In another example, the memory device 41 could be a radio frequency identification (RFID) tag, wherein means 43 is an RFID reader. The information that may be stored on the memory device 41 may include identification (ID) of the tool 18, tool capability, calibration parameters, etc. The storage device 41 of the tool 18 is mounted in such a way that it can be read by means 43 of the base unit 18 when the tool 18 is correctly connected to the base unit 16. The connectors of means 43 may for example be located at the front of the base unit 16, whereas the contacts of the memory device 41 are located at the back of the tool 18, as indicated in FIG. 2, preferably such that the contacts and connectors are protected from dust and dirt when the tool 18 is correctly connected to the base unit 16. Alternatively or complementary, other equipment (not shown) external of the device 10 may have said means 43 for reading information from, and/or writing information to, the memory device 41 of the tool 18, for example when adjustments are made after calibration of the tool 18.

The device 10 is adapted to be controlled by the (external) control station 28 to perform at least some of the operation related to the vehicle 20, if the aforementioned means 34 detects that the device 10 is connected to the robot 12. The device 10 may for example receive machine-readable instructions from the control station 28 by means of the communications unit 26, which instructions may be used by the processor 30 to control the actuator(s) 36 that moves the tool 18 or to control the tool 18 directly in case there is no actuator. Furthermore, the device 10 may be adapted to be controlled by the control station 28 to perform some of the operation related to the vehicle 30 also if the means 34 detects that the device 10 is directly used by the human, as will be exemplified below.

The device 10 is part of the system 100, which system 100 also may comprise the robot 12, the control station 28 and a device holder 42. The system 100 may be arranged in a vehicle service center 44, and the aforementioned operation may be a service operation. Alternatively, and as also already mentioned hereinabove, the device 10 and the system 100 may likewise be used in a vehicle manufacturing facility. Hence, manufacturing and/or servicing of vehicles and vehicle related objects may be facilitated by the present invention.

The device holder 42 is adapted to hold and charge the device 10 when the device 10 is not used. To this end, the device holder 42 comprises a charger 45. The charger 45 may be adapted to wirelessly charge the energy storage 32 of the device 10, i.e. without physical connectors and cables.

The control station 28 is adapted to control the device 10 to various degrees. To this end, the control station 28 is adapted to wirelessly communicate with the device 10. The control station 28 for example controls the device 10 to perform all of the operation (except positioning of the device 10) when the device 10 is connected to the robot 12. The control station 28 may also control the device 10 to perform some or a part of the operation when the device 10 is used directly by the human 14. The control station may also control the robot 12 so as to correctly position the device 10 when the device 10 is connected to the robot 12. To this end, the control station 28 may also be adapted to communicate with the robot 12.

Furthermore, the control station 28 may comprise a database 46 with protocols and/or instructions for a plurality of different operations related to the vehicle 20 or a vehicle related object to be performed by means of the tool 18 of the device 10 when connected to the robot 12 or used directly by the human 14.

The system 100 could comprise at least one additional control station (not shown) with which the control station 28 may communicate, for example get orders or send status reports.

Figure 3:
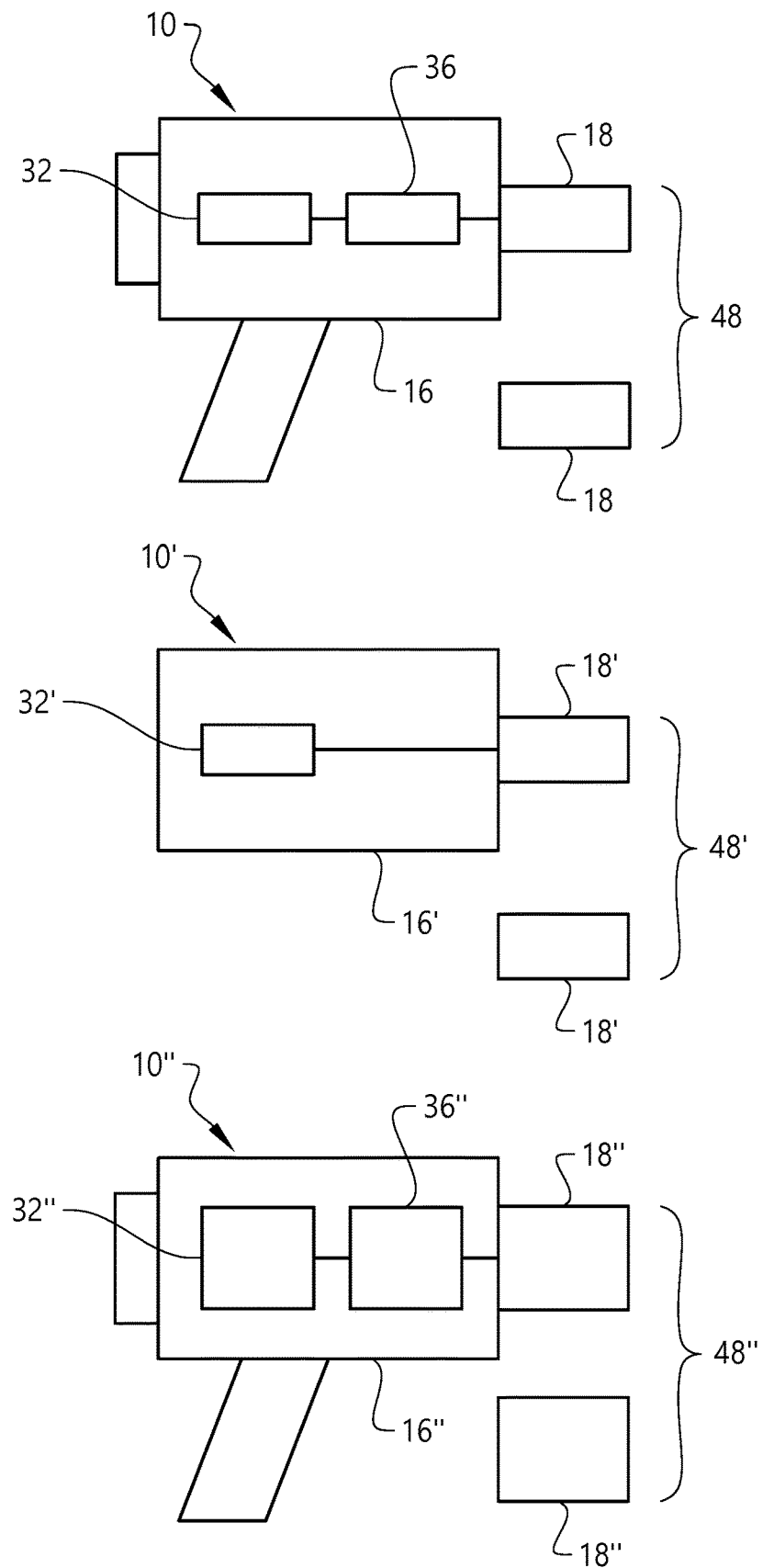
FIG. 3 illustrates an expanded system of FIG. 1.

The system 100 may in addition to the (first) device 10 comprise additional devices, for example a second device 10' and a third device 10", see FIG. 3. Different tools 18 of a first group 48 are connectable to the base unit 16 of the first device 10, different tools 18' of a second group 48' are connectable to the base unit 16' of the second device 10', and different tools 18" of a third group 48' are connectable to the base unit 16" of the third device 10". Furthermore, the base units 16, 16', 16" of the first to third devices 10, 10', 10" have different properties and/or features depending on the tools 18, 18', 18" of the first to third groups 48, 48', 48".

For example, the base unit 16 of the first device 10 comprises an actuator 36 in the form of the aforementioned electrical motor, and the tools 18 of the first group 48 may be the aforementioned screwdriver and socket wrench. The base unit 16' of the second device 10' does not have an actuator, and the tools 18' of the second group 48' may be the aforementioned camera and LIDAR device. The base unit 16" of the third device 10" comprises an actuator 36" in the form of more powerful electric motor than that of the first device 10 as well as a higher capacity energy storage than that of the first device 10, and the tools 18" of the third group 48" may be a screwdriver and a socket wrench for greater dimensions than those of the first group 48.

Figure 4:
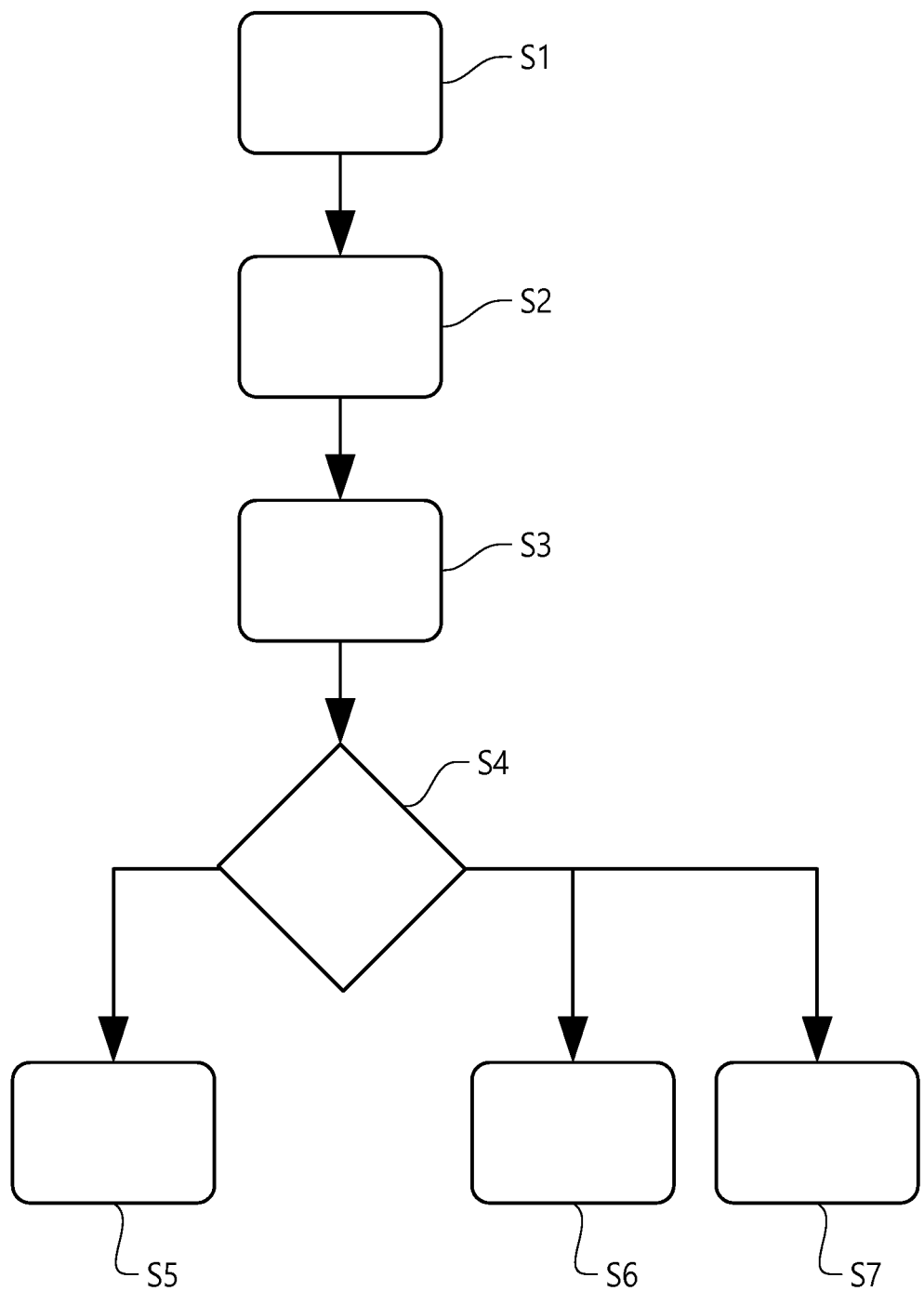
FIG. 4 is a flow chart of a method according to one or more embodiments of the invention.

In use, with further reference to FIG. 4, the device 10 is initially in the device holder 42 (S1), and the processor 30 is shut down or in idle mode. The illustrated vehicle 20 is a truck, but it could alternatively be a tractor, a bus, a construction equipment, etc. Instead of being related to a vehicle, the operation may be related to a vehicle related object (not shown), such as an engine, a gearbox, etc.

At S2, the device 10 is removed from the device holder 42 by the robot 12 or by the human 14, whereby the processor 30 wakes up.

The device 10 may then present itself to the control station 28 at S3, for example by transmitting its ID, software version, capability (such as current charge level of the energy storage 32 and type of actuator 36), current tool 18 connected to the base unit 16 (based on information stored in the memory device 41 as read by means 43), etc. to the control station 28 by means of the communications unit 26.

The device 10 also detects whether the device 10 is connected to the robot 12 or used directly by the human 14 using means 34 in step S4, and transmits to the control station 28 information regarding whether the device 10 is connected to the robot 12 or used directly by the human 14.

Before step S2, there may be an intermediate step wherein the control station 28 decides whether the operation should be carried out by the robot 12 or directly by the human 14, for example depending on the current availability of robots and humans in the vehicle service center 44. In this case, the information regarding whether the device 10 is connected to the robot 12 or used directly by the human 14 transmitted from the device 10 may serve as a confirmation for the control station 28 that the device 10 is used by the correct entity. After the decision, the control station 28 may instruct the human to remove the device 10 from the holder 44, or it may control the robot 12 so that the robot 12 connects itself to the robot connector 22 and removes the device 10 from the holder 44, depending on which entity that should use the device 10.

If the means 34 detects that the device 10 is connected to the robot 12, the control station 28 controls both the robot 12 and the device 10 to perform the operation (step S5). On the other hand, if the means 34 detects that the device 10 is used directly by the human 14, the human 14 controls the device 10 to perform at least some of the operation (step S6 or S7).

In step S5, the robot 12 positions the device 10 as controlled by the control station 28. The robot 12 may for example position the device 10 so that its tool 18 can access a screw of the vehicle 20, whereas the turning of the tool 18 (i.e. a screwdriver) is controlled wirelessly by the control station 28. That is, the control station 28 sends the aforementioned machine-readable instructions to the device 10, which instructions are received by the communications unit 26 and used for example by the processor 30 to control the actuator(s) 36 that moves the tool 18.

In step S6, the human 14 controls the device 10 to perform a part of the operation, and the control station 28 control the device 10 to perform another part of the operation. For example, in case the tool 18 connected to the base unit 16 is a socket wrench, the human 14 may accurately position the socket wrench relative to the nut or bolt in question, whereas the turning of the socket wrench (speed and/or torque) is controlled wirelessly by the control station 28.

In step S7, the human 14 controls the device 10 to perform the complete operation. The operation may for example be turning a plurality of screws, nuts or bolts to a predetermined torque. For such an operation, no involvement of the control station 28 may be necessary.

In view of the above, step S5 may be regarded as automatic, step S6 may be regarded as semi-automatic, and step S7 may be regarded as manual. Whether step S6 or S7 is performed depends for example on the type of operation.

At least in steps S6 and S7, the user interface 40 may present information related to the operation for the human 14. The information may for example come from the aforementioned sensor(s) 38 or from the control station 28. The information may for example include instructions for the human 14 regarding how to perform the operation, the progress of the operation, request some input from the human 14, etc. The user interface 40 may for example include three LEDs (left-center-right) which may guide the human 14 so as to accurately position the socket wrench in step S6 based on positional data or imagery from the sensor 38. In another example, the control station 28 may inform the human 14 of correct torque for various screws, nuts or bolts via the user interface 40 in step S7. In another example, when a new tool 18 is connected to the base unit 16 and identified using the memory device 41 and means 43, if the new tool 18 does not match instructions from the control station 28 (e.g. the instructions stipulate a high torque that the new tool 18 cannot handle), an error indication may be presented on the user interface 40. The error indication may also be sent to the control station 18 via the communications unit 26. The user interface 40 may also receive input from the human 14. The input may for example be a confirmation from the human 14 that the device 10 has been positioned accurately in step S6 before turning of the socket wrench is started by the control station 28, or an indication from the human 14 that all screw, nuts or bolts have been fastened correctly in step S7.

Furthermore, at any time before or during the operation, the control station 28 may receive information from at least one of the device 10, the robot 12, the human 14 and the vehicle 20, and select operation and/or adapt/adjust control of the operation accordingly. For example, before the operation, the vehicle 20 may send vehicle ID, vehicle data (model, production year, ECU data such as fault codes, etc.) to the control station 28. Another example is the information sent from the device 10 to the control station 28 in the aforementioned step S3. In another example, during step S5 or S6, the device 10 may send information originating from data detected by the sensor(s) 38 to the control station 28 via the communications unit 26, so that the control station 28 can adapt or adjust the control of at least one of the robot 12 and the device 10 accordingly. The robot 12 may inform the control station 28 about its position, any fault code, etc. The human 14 could enter information directly to the control station 28, i.e. not via the user interface 40 of the device 10.

It is to be understood that the present invention is not limited to the embodiments described above and illustrated in the drawings; rather, the skilled person will recognize that many changes and modifications may be made within the scope of the appended claims.

The invention claimed is:

1. A device interchangeably usable by a robot and a human, wherein the device comprises:
   a base unit including a robot connector for connection to the robot, at least one of a surface grippable by the human and a grip grippable by the human, a communications unit for wireless communication with a control station, a processor connected to the communications unit, an energy storage for powering at least the communications unit and the processor, and a circuit adapted to detect whether the device is connected to the robot or used directly by the human; and
   a tool for performing an operation related to a vehicle or a vehicle related object, which tool is connected to the base unit,
   wherein the device is adapted to be controlled by the control station to perform at least some of the operation related to a vehicle or a vehicle related object if said circuit detects that the device is connected to the robot.

2. The device according to claim 1, wherein the device is adapted to be controlled by the control station to perform some of the operation related to a vehicle or a vehicle related object if said circuit detects that the device is used directly by the human.

3. The device according to claim 1, wherein said circuit is adapted to detect whether the device is connected to the robot or used directly by the human by detecting whether the robot connector is connected to the robot.

4. The device according to claim 1, wherein the processor is adapted to wake up when the device is removed from a device holder.

5. The device according to claim 1, wherein the device is adapted to inform the control station whether the device is connected to the robot or used directly by the human.

6. The device according to claim 1, wherein the tool is removably connected to the base unit.

7. The device according to claim 1, wherein the base unit further includes at least one actuator adapted to move the tool, and wherein the at least one actuator is powered by electric energy from the energy storage and controlled via the processor.

8. The device according to claim 1, wherein the base unit further includes at least one sensor adapted to detect internal or external data of the device, and wherein the processor is configured to read and analyse the detected data.

9. The device according to claim 1, wherein the base unit further includes a user interface adapted to present information related to said operation for the human.

10. A system, comprising:
    a device according to claim 1;
    a device holder adapted to hold and charge the device; and
    the control station, wherein the control station is adapted to control the device at least when the device is connected to the robot.

11. The system according to claim 10, wherein said device is a first device, wherein one or more different tools of a first group are connectable to the base unit of the first device, wherein the system further comprises a second device that is substantially identical to the first device, and wherein one or more different tools of a second group which is different than the first group are connectable to the base unit of the second device.

12. The system according to claim 11, wherein the base unit of the first device and the base unit of the second device have different properties and/or features depending on the tool of the first and second groups.

13. The system according to claim 10, arranged in a vehicle service center.

14. A method of operating a device according to claim 1, wherein the method comprises the steps of:
    the device detecting whether it is connected to the robot or used directly by the human;
    if the device detects that it is connected to the robot, the control station controlling both the robot and the device to perform the operation related to a vehicle or a vehicle related object; and
    if the device detects that it is used directly by the human, the human controlling the device to perform at least some of the operation related to a vehicle or a vehicle related object.

15. The method according to claim 14, wherein if the device detects that it is connected to the robot, the robot only positions the device as controlled by the control station.

16. The method according to claim 14, wherein if the device detects that it is used directly by the human, the human controls the device to perform a part of the operation related to a vehicle or a vehicle related object, and the control station controls the device to perform another part of the operation related to a vehicle or a vehicle related object.

* * * * *